(12) United States Patent
Erie et al.

(10) Patent No.: US 6,330,824 B1
(45) Date of Patent: Dec. 18, 2001

(54) PHOTOTHERMAL MODULATION FOR OSCILLATING MODE ATOMIC FORCE MICROSCOPY IN SOLUTION

(75) Inventors: Dorothy A. Erie, Pittsboro; Glenn Ratcliff, Mebane; Richard Superfine, Chapel Hill, all of NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 09/506,617

(22) Filed: Feb. 18, 2000

Related U.S. Application Data

(60) Provisional application No. 60/120,821, filed on Feb. 19, 1999.

(51) Int. Cl.[7] ............................. G01B 5/28; H01J 37/252
(52) U.S. Cl. ........................................... 73/105; 250/306
(58) Field of Search ........................ 73/105; 250/306, 250/307

(56) References Cited

U.S. PATENT DOCUMENTS

| | | | |
|---|---|---|---|
| 5,003,815 | 4/1991 | Martin et al. | 73/105 |
| 5,261,015 | * 11/1993 | Glasheen | 385/23 |
| 5,357,105 | 10/1994 | Harp et al. | 250/234 |
| 5,445,011 | 8/1995 | Ghislain et al. | 73/105 |
| 5,513,518 | 5/1996 | Lindsay | 73/105 |
| 5,515,719 | 5/1996 | Lindsay | 73/105 |
| 5,581,082 | * 12/1996 | Hansma et al. | 73/105 |
| 5,595,942 | * 1/1997 | Albrecht et al. | 250/307 |
| 5,612,491 | 3/1997 | Lindsay | 73/105 |
| 5,670,712 | 9/1997 | Cleveland et al. | 73/105 |
| 5,737,086 | 4/1998 | Gerber et al. | 356/432 |
| 5,750,989 | 5/1998 | Lindsay et al. | 250/306 |
| 5,753,814 | 5/1998 | Han et al. | 73/105 |
| 5,929,440 | * 7/1999 | Fisher | 250/338.1 |
| 6,080,988 | * 6/2000 | Ishizuya et al. | 250/338.1 |
| 6,118,124 | * 9/2000 | Thundat et al. | 250/338.1 |

OTHER PUBLICATIONS

Hansma, P.K. et al. "Tapping mode atomic force microscopy in liguids", Appl. Phys. Lett. vol. 64, No. 13, Mar. 1994, pp. 1738–1740.*

Barnes et al.; *Erratum: A femtajoule calorimeter using micromechanical sensors*, Rev. Sci. Instrum. 65:12 3793–3798 (Dec. 1994).

Gimzewski et al.; *Observation of a chemical reaction using a micromechanical sensor*, Chemical Physics Letters 217:5.6 589–594 (Jan. 28, 1994).

Han et al.; *A magnetically drives oscillating probe microscope for operation in liquids*, Appl. Phys. Lett. 69:26 4111–4113 (Dec. 23, 1996).

Hansma et al.; *Tapping mode atomic force microscopy in liquids*, Appl. Phys. Lett. 64:13 1738–1740 (Mar. 28, 1994).

Hillier et al.: *ac–mode atomic force microscope imaging in air and solution with a thermally driven bimetallic antilever probe*, Rev. Sci. Instrum. 68:5 3082–3090 (May 1997).

Hu et al.; *Scanning Polarization Force Microscopy: A technique for imaging liquids and weakly adsorbed layers*, Appl Phys. Lett. 67:4 476–478 (Jul. 24. 1995).

Lee et al.; *Development of a piezoelectric self–excitation and self–detection mechanism in PZT microcantilevers for dynamic scanning force microscopy in liquid*, J. Vac. Sci. Technol. B 15:4 1559–1563 (Jul/Aug 1997).

(List continued on next page.)

Primary Examiner—Hezron Williams
Assistant Examiner—Michael Cygan
(74) *Attorney, Agent, or Firm*—Myers Bigel Sibley & Sajovec

(57) ABSTRACT

A method of imaging a sample present in a solution by employing an atomic force microscope comprises providing an atomic force microscope having a cantilever that is under the solution, contacting the cantilever with energy to cause the cantilever to bend and vibrate, and detecting the amplitude of vibration of the cantilever from the energy. The cantilever has at least one coating present thereon to absorb energy such that the cantilever bends and vibrates.

20 Claims, 6 Drawing Sheets

OTHER PUBLICATIONS

Putman et al.; *Tapping mode atomic force microscopy in liquid*, Appl. Phys. Lett. 64:18 2454–2456 (May 2, 1994).

Ratcliff et al.; *Photothermal Modulation for Oscillating Mode Atomic Force Microscopy in Solution*, Biophysical Journal 74:2 part 2 (Feb. 1998) Tu–Pos241, Atomic Force Microscopy, p. A187.

Ratcliff et al; *Photothermal Modulation for Oscillating Mode Atomic Force Microscopy in Solution*, Applied Physics Letters 72:15 1911–1913 (Apr. 13, 1998).

Sokolov et al.; *Improved atomic force microscopy resolution using an electric double layer*, ©1997 American Institute of Physics. [S0003–6951(97)04007–2] 3 pp.

Umeda et al.; *Scanning attractive force microscope using photothermal vibration*, J. Vac. Sci. Technol. B 9:2 1318–1322 (Mar/Apr 1991).

Varesi et al.; *Photothermal measurements at picowatt resolution using uncooled micro–optomechanical sensors*, Appl. Phys. Lett. 71:3 306–308 (Jul. 1997).

* cited by examiner

PHOTOTHERMAL MODULATION FOR OSCILLATING MODE ATOMIC FORCE MICROSCOPY IN SOLUTION

CROSS-REFERENCE TO RELATED APPLICATIONS

The instant application claims priority to U.S. Provisional Application No. 60/120,821 filed Feb. 19, 1999, the disclosure of which is incorporated by reference herein in its entirety.

The present invention was made with Government support under Grant Number HPCC ASC-9527192 from the National Science Foundation. The Government has certain rights to this invention.

FIELD OF THE INVENTION

The invention generally relates to methods of solution imaging and systems relating to the same.

BACKGROUND OF THE INVENTION

Atomic force microscopy (AFM) has proven to be a potentially valuable tool for studying biological systems. AFM imaging under solution allows one to potentially monitor biological processes m real time at a macromolecular level. A possible major problem with solution imaging occurs with samples, such as DNA, that are weakly absorbed to a surface, because they are easily displaced during imaging. This problem can be alleviated by resonance techniques that oscillate the cantilever as the sample is scanned laterally. There is a great need for reliable implementation of resonance mode imaging in solution because the most common techniques typically yield quality images infrequently.

SUMMARY OF THE INVENTION

In one aspect, the invention provides a method of imaging a sample present in a solution. The method comprises providing a microscope having a cantilever that is under the solution, contacting the cantilever with energy to cause the cantilever to bend and vibrate, and detecting the amplitude of vibration of the cantilever from the energy. The cantilever has at least one coating present thereon to absorb energy wherein the cantilever bends and vibrates.

BRIEF DESCRIPTION OF THE DRAWINGS

FIG. 9A illustrates a photograph of the DNA prior to manipulation. FIG. 9B illustrates a photograph of the DNA after manipulation. FIG. 9C illustrates a photograph of the DNA a few minutes after manipulation.

DETAILED DESCRIPTION OF THE PREFERRED EMBODIMENT

The invention will now be described in greater detail with respect to the preferred embodiments set forth herein. It should be emphasized however that these embodiments are for the purposes of illustration only, and do not limit the scope of the invention defined by the claims.

An application of photothermal-modulation excitation of an AFM cantilever for resonance mode imaging in solution is presented. In one aspect of the invention, this application is demonstrated by producing high-quality images of DNA in solution, and presenting a quantitative analysis of the mechanical and thermal properties of a laser-heated cantilever.

In one embodiment, the support that holds the chip to which the cantilever is attached is oscillated by a piezoelectric transducer. While this approach can produce reliable resonance spectra in air, in liquid, the coupling of the support vibration to acoustic modes of the liquid produces spectra that contain many features unrelated to the cantilever vibrational modes. In general, this technique is potentially sensitive to solution conditions as well as to the properties of the individual cantilever being employed. It is clearly of interest to limit the vibrational excitation to the cantilever.

Recently, techniques that drive the cantilever directly, such as magnetic modulation and thermal modulation with remote resistive heating, have been proposed for solution imaging. Thermal modulation techniques typically exploit the temperature-dependent bending of a cantilever due to the difference in the thermal expansion coefficients between a deposited metal film and the cantilever material. In other contexts, the temperature-dependent bending of AFM cantilevers has been proposed to develop a femtojoule calorimeter and to observe heat fluctuations of a gas phase chemical reaction. Previously, photothermal modulation of metal-foil cantilevers has been used to image in air.

Figure 1:
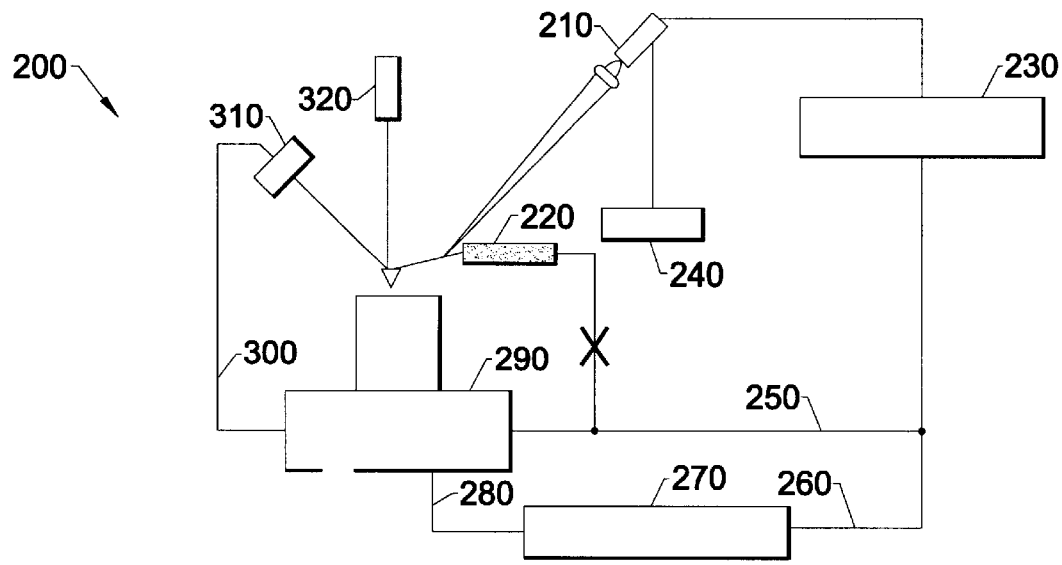
FIG. 1 illustrates a diagram of a conventional Atomic Force Microscopy (AFM) system.

The invention will now be illustrated in reference to the drawings. One example of an instrumental setup is diagrammed in FIG. 1 and depicted as 200. The numbered elements set forth in FIG. 1 correspond to the following features: position laser 320, position detector 310, heating laser 210, cantilever 220, modifying circuit 230, x-y transition stage 240, drive frequency 250, reference 260, lock-in amplifier 270, feedback signal in 280, scope base 290, and response signal 300. A description of the system is present in Ratliff et al., *Applied Physics Letters,* 72(15), pp. 1911–1913 (1998). In accordance with the present invention, the photothermal modulation of cantilevers using a modulated semiconductor laser to obtain high-quality images is disclosed. If desired, conventional cantilevers can be employed. The vibration of the cantilever may be generated by focusing a modulated diode laser (heating laser 210), such as, for example, a modulated/variable-power visible-laser module onto the cantilever 220 using a single lens that produces a spot. A commercial example of such a cantilever is made commercially available by Coherent, Inc. of Santa Clara, Calif. The spots may be of various sizes. One example of a size is about 20 $\mu$m. It should be appreciated that other lasers may also be employed. A standard AFM controller (for example, Digital Instruments, Inc. Nanoscope III of Santa Barbara, Calif. may be used, and an AC drive signal may be applied to the diode laser. As an example, the drive signal typically powers the piezoelectric transducer (FIG. 1). The position of the laser spot may be preferably determined by observing the oscillating part of the photodiode top-bottom signal. This position is, typically, at the base of the cantilever where it makes contact with the support. Although not wishing to be bound by a single theory, Applicants propose a time-dependent model for heat flow down a thin rod to model temperature-dependent bending of the cantilever. Applicants do not wish to be bound by this time-dependent model.

Although not wishing to be bound by theory, the derivation of the response of the cantilever to the illumination by a heating laser involves two parts: the determination of the temperature profile in the cantilever and the mechanical response of the cantilever to the temperature distribution. The bending of the cantilever due to a temperature profile $T(x)$ measured with respect to the ambient temperature, is governed by the second-order differential equation $$\frac{d^2 z}{dx^2} = aT(x), \quad (1)$$

$$a = 6(\alpha_2 - \alpha_1) \frac{t_1 + t_2}{t_2^2} \left[ 4 + 6\left(\frac{t_1}{t_2}\right) + 4\left(\frac{t_1}{t_2}\right)^2 + \left(\frac{E_1}{E_2}\right)\left(\frac{t_1}{t_2}\right)^3 + \left(\frac{E_2}{E_1}\right)\left(\frac{t_2}{t_1}\right) \right]^{-1}, \quad (2)$$

where the subscripts refer to the two layers (1: Au, 2: $Si_3N_4$), $\alpha$ is the thermal coefficient of expansion ($\alpha_1 = 14.2 \times 10^{-6}$ $K^{-1}$, $\alpha_2 = 3.2 \times 10^{-6}$ $K^{-1}$), $t$ is the layer thickness ($t_1 = 0.05$ $\mu m$, $t_2 = 0.6$ $\mu m$), E is the Young's modulus ($E_1 = 0.8 \times 10^{11}$ N $m^{-2}$, $E_2 = 1.8 \times 10^{11}$ $Nm^{-2}$), z is the coordinate normal to the beam axis, and x is the coordinate along the beam. In general, for the above equation, subscript 1 refers to the substrate and subscript 2 refers to the coating. In a preferred embodiment, to evaluate the temperature profile, it is most preferable to specify the manner in which the energy from the laser beam is deposited into the cantilever, the heat losses, and the boundary conditions. One set of conditions that is typically sufficient to describe the main features of the problem while providing an analytical solution is the periodic heating of a thin rod at its end. The temperature is considered to be substantially constant through the cross section, while sustaining heat loss along the rod to a surrounding medium at a rate proportional to the temperature difference with that medium.

Although not intending to be bound by any one theory, an example of the temperature profile may be illustrated by:

$$T(x) = Ae^{-qx} \cos(\omega t - q'x),$$

$$q = \{[v + (v^2 + \omega^2)^{1/2}]/2K\}^{1/2},$$

$$q' = \{[-v + (v^2 + \omega^2)^{1/2}]/2K\}^{1/2},$$

$$v = Hp/(C\rho w).$$

The thermal diffusivity $K = \kappa/C\rho$ is the ratio of the thermal conductance $\kappa$ to the product of the heat capacity C and the mass density $\rho$. H characterizes the heat flow into the medium, P is the perimeter of the cantilever, and w is the cantilever width. $\omega$ is the pulse frequency of the laser (i.e., $2\Pi$ times the laser modulation frequency).

Again not intending to be bound by theory, a model for the heat flow into a surrounding medium is to assume that the heat is conducted across a boundary layer of thickness b and set $H = \kappa_w/b$. In one embodiment, the medium is water ($\kappa_w = 0.71$ W $m^{-1}$ $K^{-1}$); a boundary layer of b is equal to 10 $\mu m$. As an example, a 100 $\mu m$ long triangular cantilever with legs of width 20 $\mu m$ as a 100 $\mu m$ rectangular cantilever with a 40 $\mu m$ width may be modeled. In the event that the cantilever employs a relatively thin (preferably between about 10 to about 400 nm) metal layer on a dielectric, the thermal properties, like the mechanical properties, should preferably be modeled as a laminated system; $C\rho$ is replaced with $(C\rho)_{eff} = (C_1\rho_1 t_1 + C_2\rho_2 t_2)/(t_1 + t_2)$ and $\kappa$ with $\kappa_{eff} = \kappa_1 t_1 + \kappa_2 t_2)/(t_1 + t_2)$, where the subscripts refer again to the values for the $Si_3N_4$ ($C_2 = 750$ J $kg^{-1}$ $K^{-1}$, $\rho_2 = 3.4 \times 10^3$ kg $m^{-3}$, $k_2 = 32$ W $m^{-1}$ $K^{-1}$), and gold ($C_1 = 135$ J $kg^{-1}$ $K^{-1}$, $\rho_1 = 19.3 \times 10^3$ kg $m^{-3}$, $k_1 = 346$ W $m^{-1}$ $K^{-1}$) layers. These values give $v = 85.5 \times 10^3$ $s^{-1}$ (corresponding to 13.6 kHz), and using a typical laser modulation frequency of 8 kHz ($\omega/2\pi = 8$ KHz), $q = 6.5 \times 10^4$ $m^{-1}$ and $q' = 1.76 \times 10^4$ $m^{-1}$. This solution is a heavily damped sine wave with a 1/e length given by $1/q = 15.4$ $\mu m$, and oscillation wavelength $\lambda = 2\pi/q' = 357$ $\mu m$. Not intending to be bound by theory, the above result may provide insight for the qualitative observation that to get substantial oscillation of the cantilever the heating laser should preferably be located near the base of the cantilever where it joins the support chip (x=1).

Figure 2:
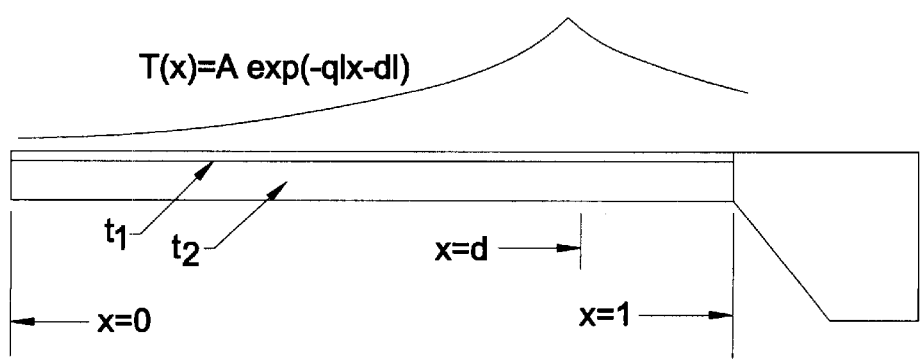
FIG. 2 illustrates a model for the mechanical and thermal properties of a cantilever.

Again not wishing to be bound by theory, in one embodiment, more quantitative insight into the preferred excitation geometry can be provided by evaluating the displacement of the cantilever free end when the temperature profile of the cantilever is given by $T(x) = A \exp(-q|x-d|)$ (see FIG. 2). This temperature profile is for the embodiment where the heat is absorbed as a delta function at location x=d, assuming the oscillating part of the spatial dependence can be ignored ($1/q \ll 1$). It is believed that by setting $P = -[\kappa_{eff}(t_1 = t_2)w] \partial T/\partial x$, where P is the amplitude of the modulated laser power that is absorbed, one can solve for $A = P/[2qw(\kappa_1 t_1 + \kappa_2 t_2)]$. An evaluation of the displacement of the cantilever, obtained by solving the second-order differential equation with the boundary conditions of $z(l) = \partial z(l)/\partial x = 0$ and enforcing the continuity of z and $\partial z/\partial x$ at x=d, is given by $z(0) = (aA/q^2)[1+L]e(\Delta-L) - e - \Delta - 2\Delta]$, wherein the dimensionless quantities $L = ql$ and $\Delta = qd$ are introduced A preferred position for the heating laser can be found by determining the value of $\Delta$ that maximizes z(0). In one example, $\Delta = 5.15$ for $L = ql = 100$ $\mu m/15.4$ $\mu m = 6.5$. For a preferred of values of L of interest (i.e., L=5–20), a preferred position of the heating laser from the cantilever base is about 1–2.5 times the decay length 1/q. For the purposes of the invention, the term "decay length" has its conventional meaning in the art and refers to the length of the cantilever that possesses a temperature different from the bulk environment surrounding the cantilever. The "cantilever base" is defined as the position at which the cantilever is attached to a supporting structure. Although not intending to be bound by theory, it is believed that a potential physical explanation for this result is that the temperature modulation and (and hence, cantilever bending) are confined to a region on the order of 1/q. It is preferable to place this region at the base because any bending there will produce a magnified deflection of the cantilever end. Finally, in an embodiment wherein $\Delta = 5.15$ and $L = 6.5$, one observes that a 1 mW modulation amplitude of the absorbed laser power will produce a 40 nm deflection of the free end. In another embodiment, an amplitude modulation of laser illumination of approximately 2 mW with an estimated absorption in the AuPd overlayer of approximately 30% produces an oscillation amplitude of 10 nm.

As an example, high-resolution solution images may be obtained using both 100 and 200 $\mu m$ long $Si_3N_4$ cantilevers having preferred spring constants of 0.58 and 0.12 N/m, respectively. In a preferred embodiment, the cantilever has a spring constant ranging from about 0.02 N/m to about 1 N/m. Due to the presence of potentially sizeable amplitude in the solution, it is preferred to darken (e.g., blacken) the top of the cantilever to increase the absorption of the laser light. The back of the cantilever may be darkened by various methods, e.g., by painting the back of the tip chip with black paint or by sputter coating the tip chip with a gold/palladium alloy. Other darkening techniques can be employed.

Figure 3A:
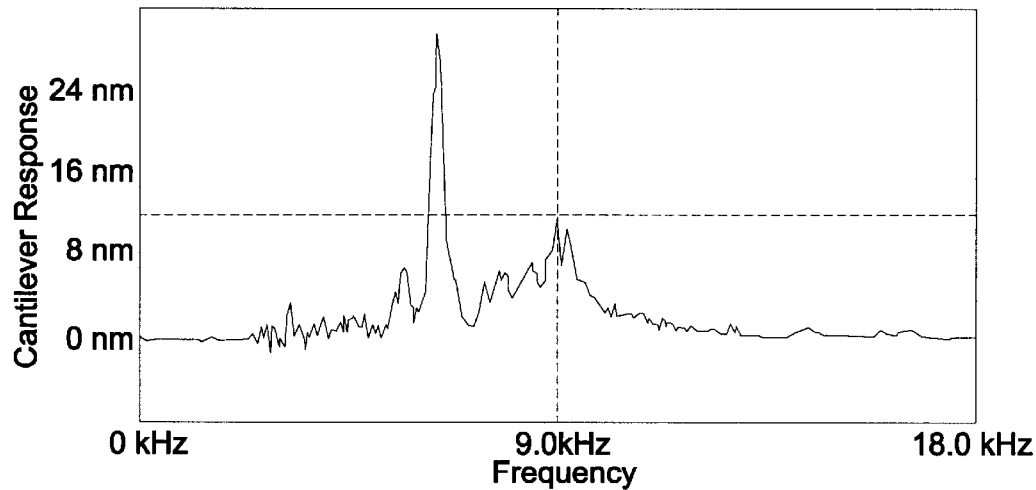
FIG. 3 illustrates a resonance spectra of a blackened 100 $\mu$m long triangular cantilever driven (a) mechanically and (b) photothermally in water.
Figure 3B:
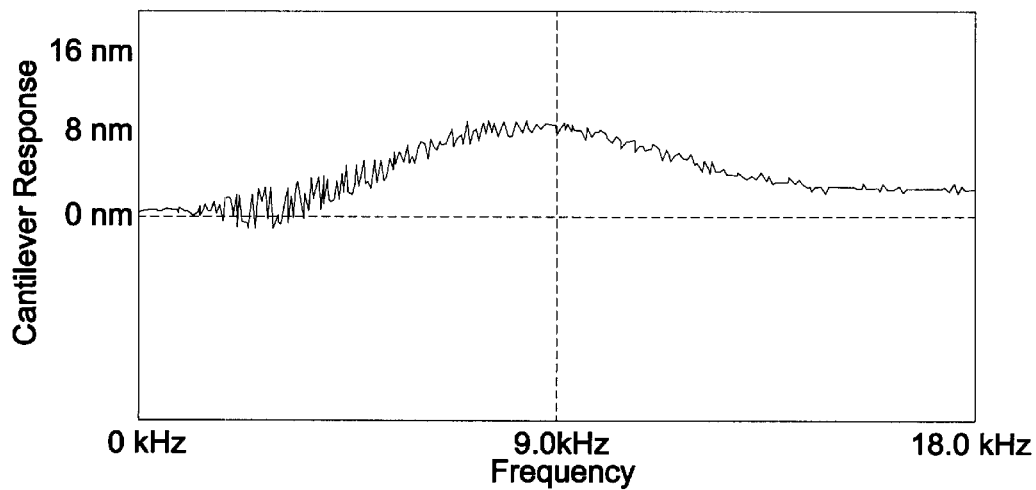

FIG. 3 illustrates typical responses of a paint-blackened 100 μm cantilever driven mechanically and photothermally in solution. Similar results were obtained with both 100 and 200 μm Au/Pd-coated cantilevers. The mechanically driven lever generates an excitation spectrum with many resonances, while the spectrum for photothermal modulation shows a single resonance at 8 kHz. This resonance frequency and amplitude are believed to be dampened relative to air where a resonance frequency of 40 kHz with an amplitude of 30 to 40 nm is observed. The spurious resonances observed with the mechanically driven lever might potentially complicate frequency selection for imaging, since they are vibrations of the cantilever where the amplitude is not clipped for the feedback signal.

Figure 4:
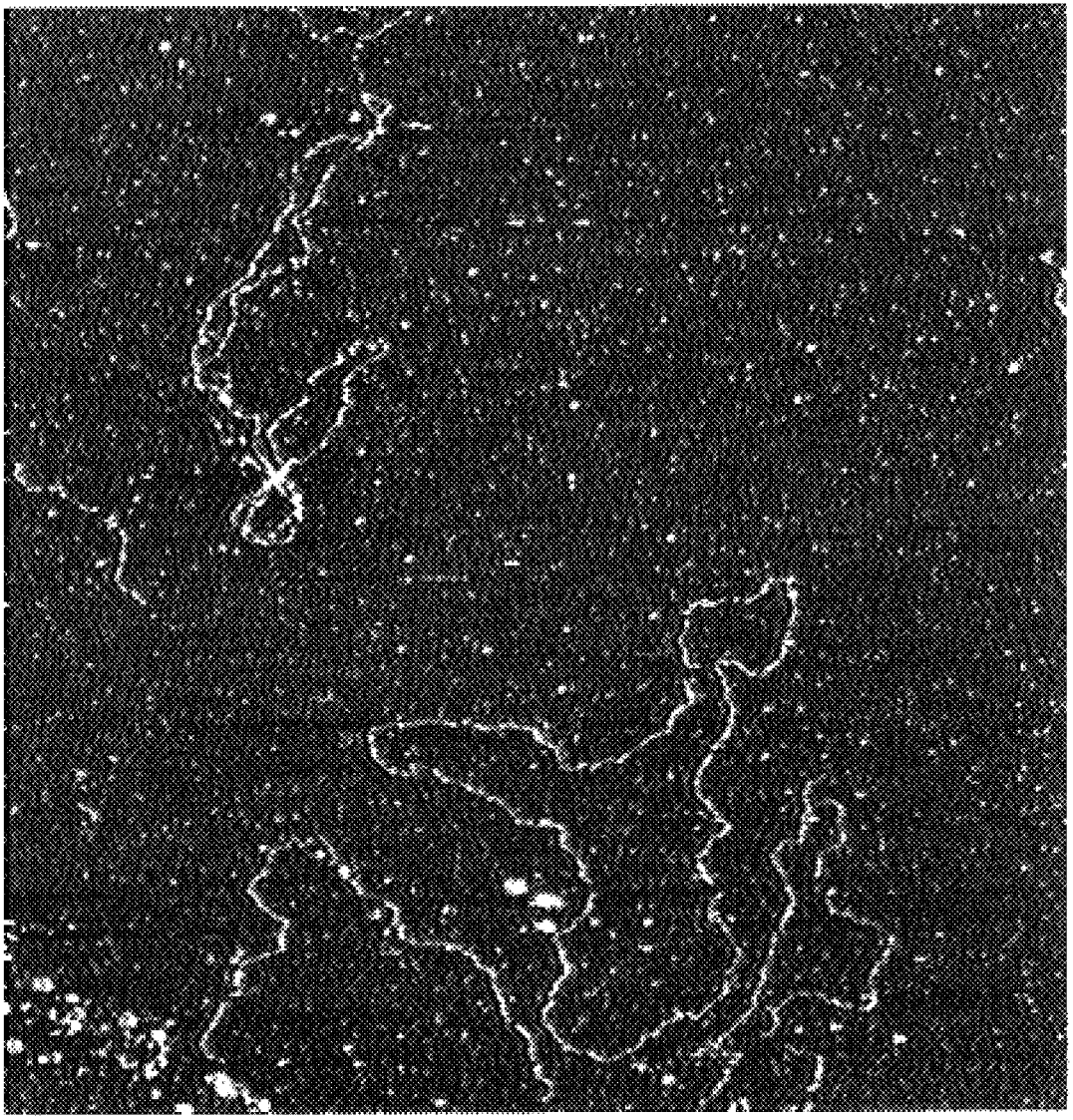
FIG. 4 illustrates an image of a 6000 base pair DNA plasmid on mica in a 50 mM HEPES buffer containing 5 mM $MgCl_2$.

The efficacy of this method is demonstrated by the image of DNA shown in FIG. 4. It should be appreciated, however, that other materials may be imaged in accordance with the invention. Examples of materials that may be imaged include, but are not limited to, biological materials (e.g., proteins, grids), as well as other materials that are typically imaged under solution. In the embodiment illustrated in FIG. 4, consecutive images of the DNA show minimal if any deformations. The measured width and height of the DNA in this embodiment are 7.0 and 2.5 nm, respectively.

The present invention demonstrates the application of photothermal modulation to directly drive the vibration of a commercially available AFM cantilever for resonance imaging in solution. Specific types of microscopes that may be employed include, without limitation, thermomicroscopes, and molecular imaging scopes. Preferably, the method of the invention represents a repulsive mode imaging process. The photothermal modulation technique is capable of cleanly exciting the fundamental cantilever vibrational mode of commercially available cantilevers.

Figure 5:
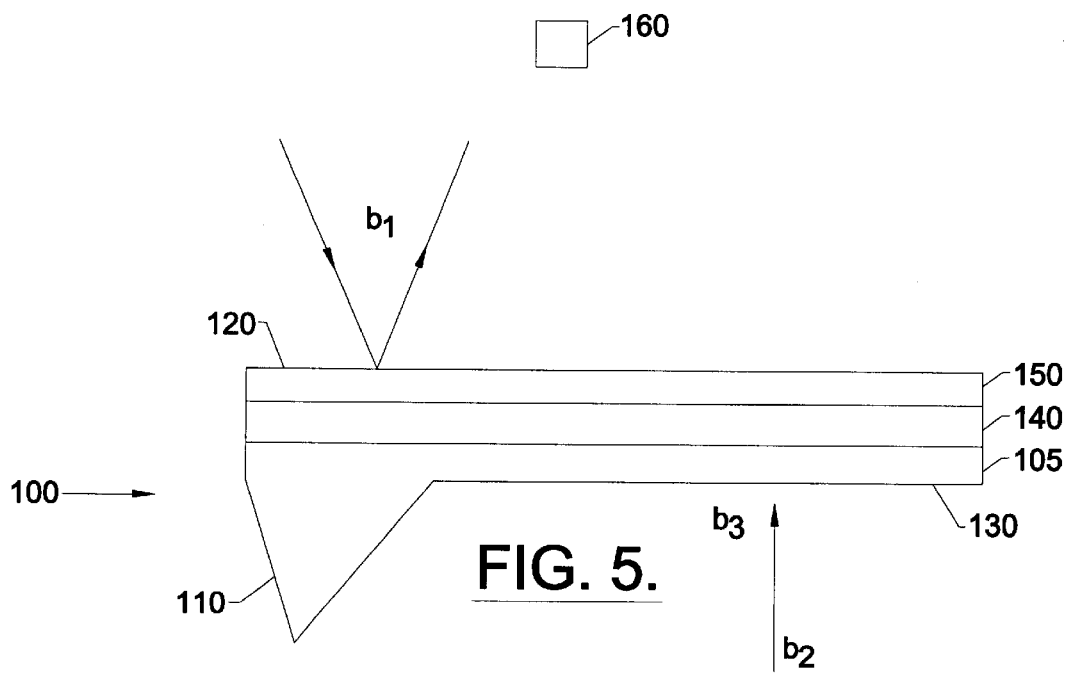
FIGS. 5 through 7 illustrate various embodiments for carrying out the method of the invention.

The invention will now be described in greater detail with reference to FIGS. 5 through 7. In each of these embodiments, although not pictured, the operation of FIG. 5 depicts a cantilever 100 positioned in a solution. Various types of solutions may be employed such as, for example, aqueous solutions, organic solutions, and combinations thereof. The uncoated cantilever 105 may be one which is conventionally known in the art and is typically made of silicon or silicon nitride ($Si_3N_4$), although other materials can be used. Examples are set forth in U.S. Pat. Nos. 5,753,814; 5,612,491; and 5,513,518, the disclosures of which are incorporated herein by reference in their entirety. The cantilever has a tip 110 and a top surface 120 opposite to the tip 110 that is present on the bottom side of the cantilever depicted by 130. A beam of radiant energy b1 from a detection laser (not shown) contacts the cantilever from its top 120 and reflects from the top to a detector 160. A beam of radiant energy b2 from a laser (not shown) designed to heat the cantilever contacts the bottom side 130 of the cantilever at a point b3. The cantilever then bends and vibrates and the detector 160 aids in monitoring the amplitude of vibration. Although radiant energy is described above, it should be appreciated that the invention is not limited to employing radiant energy. As depicted in FIG. 5, it is preferable that the heating laser beam contact the bottom side of the cantilever at a position distal from the tip 110 (b3), although other configurations may be used. It is most preferred that the position of the source of radiant energy from the cantilever base be about 1 to about 2.5 times the decay length of the cantilever (1/q) as defined herein. For example, the heating laser may be positioned above the cantilever. In many instances, the light passes through the cantilever and is absorbed by an absorbing coating described below.

As shown, the top side has at least one coating positioned thereon. In this embodiment, an absorbing coating 140 is present on the top surface 120 of the cantilever 100 and is generally intended to absorb light from the heating laser and reflect light from the detection laser. The absorbing coating 140 may be formed from various materials that allow for the absorption of light. Preferably, the absorbing coating has a thickness ranging from about 5 nm to about 100 nm. In this embodiment, coating 140 is in the form of a layer of black paint. Metals such as, for example, gold, palladium, silver, aluminum, and alloys thereof may also be used. Positioned on the absorbing coating 140 is a reflective coating 150 that allows for the selective reflection of light. As an example, the reflective coating may be formed from various metals and alloys thereof known in the art such as, for example, gold, aluminum, palladium, and silver. A preferred thickness for the reflective coating ranges from about 10 nm to about 400 mn. It is preferred that the reflective layer have an expansion coefficient that is different than a conventional cantilever made from, for example, silicon or silicon nitride.

Moreover, although not depicted, the invention may allow for the use of multiple lasers of the same or different wavelengths. In addition, the coating properties of the layers contained on the cantilever may be fashioned to as to reflect light from one laser and absorb light from another laser.

Figure 6:
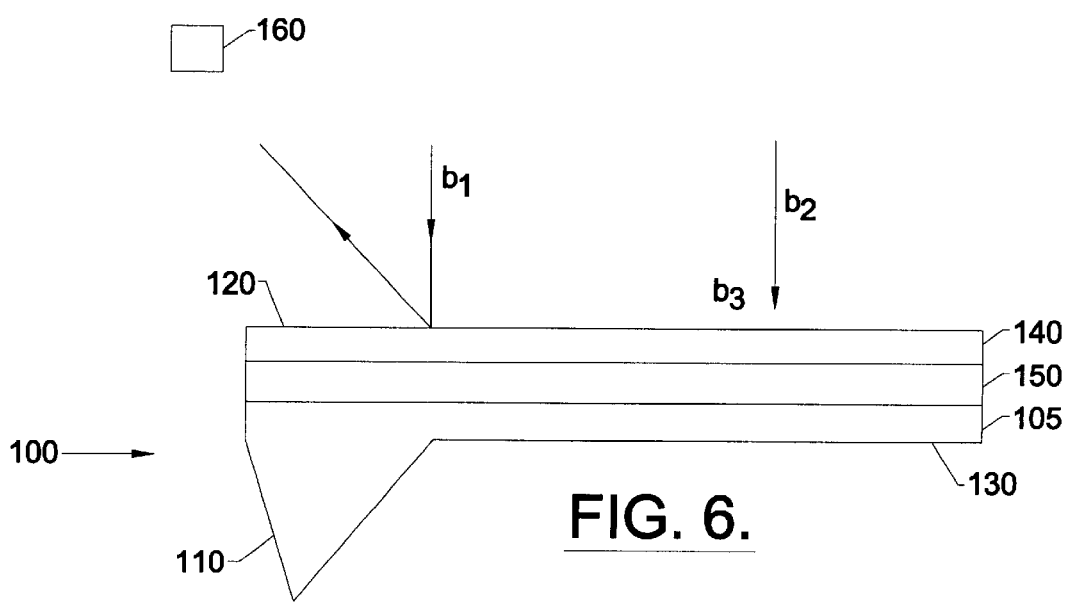

An additional embodiment is illustrated by FIG. 6. In contrast to FIG. 5, the reflective layer 150 is positioned between the absorbing layer 140 and the uncoated cantilever 105. Moreover, the beam b2 intended to heat the cantilever 100 is positioned on the same side as the detection beam b1 relative to the cantilever 100.

Figure 7:
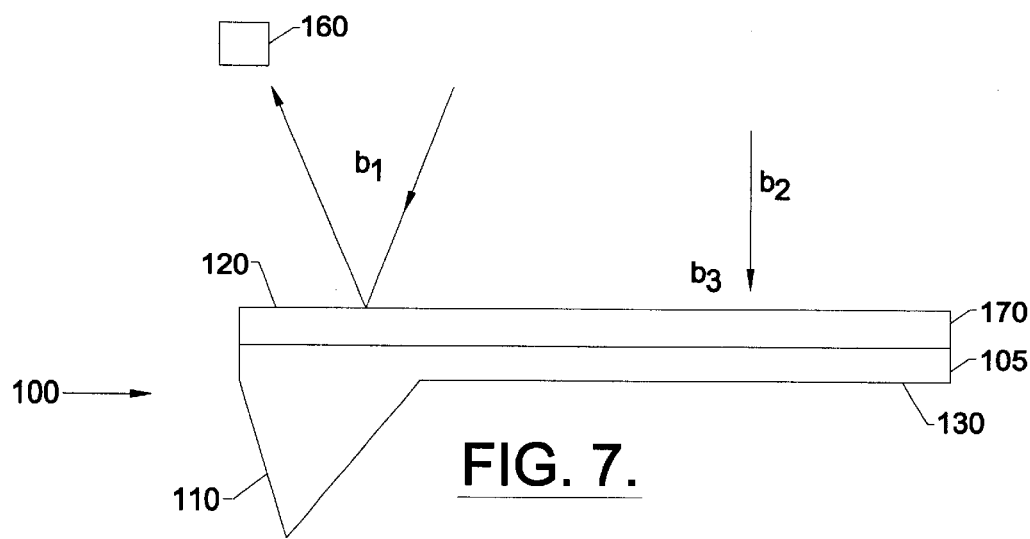

In another embodiment illustrated in FIG. 7, a single coating may be present on top of the cantilever 170. The coating 170 may exhibit both reflective and absorptive properties and may be fashioned in a manner to be selective to the various properties set forth herein. This coating may be formed from various materials such as, gold, palladium, aluminum, silver, and alloys thereof. Preferably, the coating 170 which exhibits both reflective and absorptive properties has an expansion coefficient different than the material from which the cantilever is formed, e.g., silicon or silicon nitride. The coating 170 should absorb light in sufficient quantities to induce bending and vibration of the cantilever.

Other embodiments of the system may be employed for the purposes of the invention. In one embodiment, other layers may be present in addition to the reflective and absorbing coatings 140 and 150. As an example, a dielectric coating may be present on top of the reflective coating 150 and can be formed by those materials known in the art such as, for example, polymers, magnesium fluoride, and mixtures thereof.

The operation of the coated cantilever contemplated by the invention is typically carried out by illuminating the cantilever with beam b1 from the detection laser. Energy provided from the heating laser in the form of beam b2 is then imparted to the cantilever 100 at a location b3 to commence bending and vibration of the cantilever including tip 110. The intensity of the heating laser may be selected according to various considerations, and preferably ranges from about 0.1 milliwatts (mW) to about 10 mW. The amplitude of the vibration of the cantilever is then monitored by the detection laser, although it should be appreciated that other detection methods may be used. By virtue of the operation described herein, the molecular structure of materials (e.g., biological) may be deduced. Moreover, the molecular structure of various materials may be manipulated by the invention described herein.

Advantageously, the coatings used on the cantilever described herein can be designed to select for the wavelength of light, the polarization of the light, the angle of incidence, or the direction of incidence. In addition, the reflection of the detection beam contacting the cantilever, the absorption of the heating beam contacting the cantilever, and the extent of cantilever bending may all be optimized. Although not wishing to be bound by any theory, it is believed that the above parameters can be achieved by manipulating the chemical composition, thicknesses, and/or physical properties of the various coatings present on the cantilever. As an example, the thicknesses of each of the layers used on the cantilever may range from about 1 nanometer (nm) to about 100 nm.

The present invention is highly advantageous. In one respect, the invention employs coated cantilevers having bimetallic properties. Since the expansion coefficients of the two materials present on the cantilevers are different, bending of the cantilever may be achieved by heating the cantilever. This can be contrasted to nickel foil cantilevers employed in air as described by the prior art which display a temperature gradient resulting in the bending of the cantilever. The invention is able to operate in the resonance mode of the cantilever.

In another respect, the solution imaging methods and apparatuses encompassed by the invention involve repulsive mode and intermittent contact. This is in clear contrast to air imaging which involves attractive mode, non-contact imaging. It should be noted, however, that the invention may be employed in non-contact imaging applications if so desired.

In each of these embodiments, although not pictured, the operation of laser and the imaging of the sample may be controlled by an appropriate automated software system. A commercially preferred system is Thermomicroscopes, Molecular Imaging made commercially available by Digital Instruments, Inc. of Santa Barbara, Cailf.

The invention will now be described in further detail with respect to the foregoing examples. It should be emphasized however, that the examples are for the purposes of illustration only, and are not intended to limit the scope of the invention as defined by the claims.

EXAMPLE 1

A comparison of the theoretical deflection for cantilevers having coatings made from various materials. Cantilevers D, E, and F were investigated and were all silicon cantilevers. The cantilevers were each 1 micron in thickness, 300 microns in length, and 35 microns in width. Cantilever D has a length of 300 microns, cantilever E has a length of 350 microns, and cantilever F has a thickness of 250 microns. The force constant of cantilever D was 0.05 N/m, and E and F were 0.03 N/m and 0.08 N/m respectively. Cantilever D has a resonance frequency of 140 kHz, while E and F have resonance frequencies of 10 kHz and 20 kHz respectively.

Various deflections were calculated for these cantilevers using various coating materials and thicknesses, the results of which are set forth in Table 1. Equations (1) and (2) were employed in calculating the deflections.

TABLE 1

COMPARISON OF DIFFERENT COATING MATERIALS

| COATING THICKNESS | Al | Al | Ni | Ni | Au | Au | Mo |
|---|---|---|---|---|---|---|---|
| | Deflection P: 5 mw Um | Deflection P: 7.5 mw um | Not include Reflectivity) Deflection P: 5 mw Um | Include Reflectivity) Deflection P: 5 mw Um | not include reflectivity) Deflection P: 5 mw um | Include Reflectivity) Deflection P: 5 mw Um | not include Reflectivity) Deflection P: 5 mw Um |
| Contact D | | | | | | | |
| no coating | | | | | | | |
| 20 nm | 10 | 15 | 10 | 41 | 5 | 3 | |
| 40 nm | 19 | 28 | 18 | 76 | 9 | 5 | |
| 100 nm | 41 | 61 | 36 | 149 | 19 | 11 | |
| 200 nm | 64 | 96 | 51 | 210 | 29 | 16 | |
| 300 nm | 76 | 113 | 56 | 230 | 33 | 18 | |
| 400 nm | 79 | 119 | 56 | 230 | 34 | 19 | |
| Contact E | | | | | | | |
| no coating | | | | | | | |
| 20 nm | 16 | 23 | 16 | 65 | 8 | 4 | 4 |
| 40 nm | 30 | 45 | 29 | 120 | 14 | 8 | 7 |
| 100 nm | 64 | 97 | 58 | 237 | 30 | 17 | 12 |
| 200 nm | 102 | 153 | 81 | 334 | 46 | 25 | 15 |
| 300 nm | 120 | 180 | 89 | 365 | 52 | 29 | 15 |
| 400 nm | 126 | 189 | 89 | 366 | 53 | 29 | 14 |
| Contact F | | | | | | | |
| no coating | | | | | | | |
| 20 nm | 6 | 8 | 6 | 24 | 3 | 2 | |
| 40 nm | 11 | 16 | 11 | 44 | 5 | 3 | |
| 100 nm | 24 | 35 | 21 | 86 | 11 | 6 | |
| 200 nm | 37 | 56 | 30 | 122 | 17 | 10 | |

TABLE 1-continued

COMPARISON OF DIFFERENT COATING MATERIALS

| COATING THICKNESS | Al | Al | Ni | Ni | Au | Au | Mo |
|---|---|---|---|---|---|---|---|
| 300 nm | 44 | 66 | 32 | 133 | 19 | 11 | |
| 400 nm | 46 | 69 | 32 | 133 | 20 | 11 | |

P = The thermal energy absorbed by the cantilever

These theoretical calculations allow for bending behavior to be predicted.

EXAMPLE 2

Figure 8:
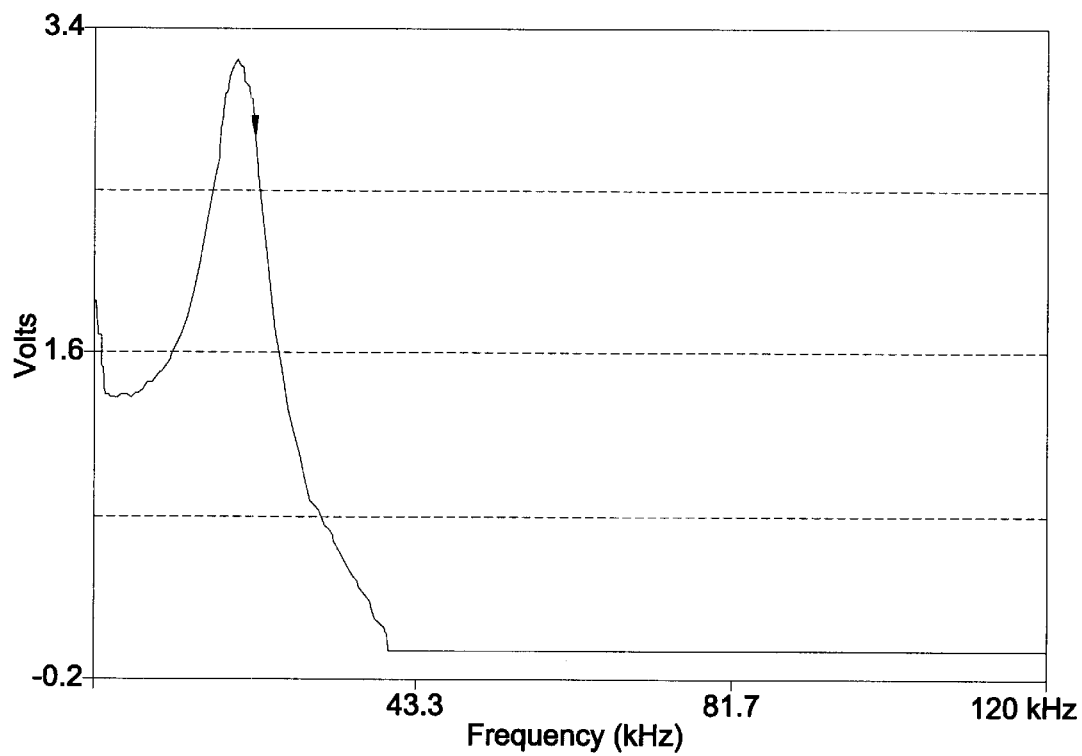
FIG. 8 illustrates the relationship between voltage and frequency for a sweep of a 200 micron triangular cantilever at 0.5 N/m.
Figure 9A:
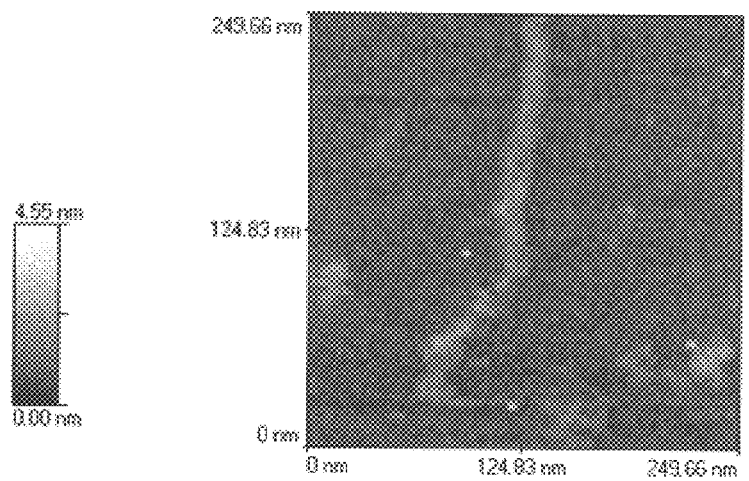
FIGS. 9A through 9C are photographs illustrating the nanomanipulation of DNA in solution using photothermal modulation for imaging.
Figure 9B:
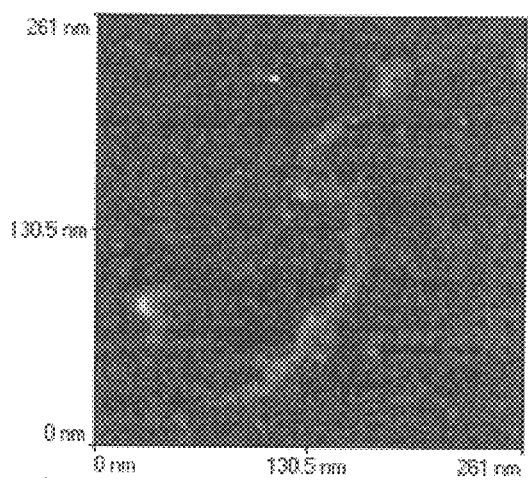
Figure 9C:
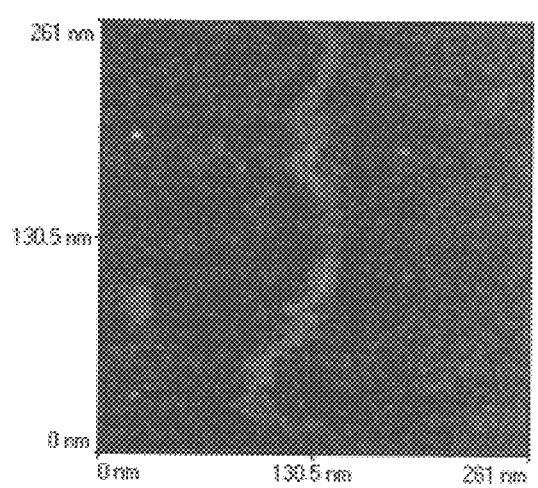

An experimental example of solution imaging is as follows. A heating laser (variable power 5 mW 640 nm) was focused on a cantilever close to where it is attached to the cantilever base. A detection laser was focused on the other end of the cantilever. A frequency sweep was obtained with standard software that operates the Thermomicroscope AFM. FIG. 8 illustrates the results of the frequency sweep. The arrow set forth in the figure depicts the frequency at which the laser was pulsed and which the cantilever was vibrated. This figure demonstrates that the system is capable of generating a resonance frequency.

EXAMPLE 3

A 6000 base pair DNA plasmid was imaged on mica in a 50 mM HEPES buffer containing 5 mM $MgCl_2$. The DNA was deposited onto a clean mica surface, then placed under solution for imaging. A 200 micron long triangular cantilever with a 15 nm layer of Au/Pd was driven at 17.46 kHz with a 20nm amplitude. A scan rate of 2.65 Hz was used for imaging. The image is illustrated in FIG. 4.

The specification describes preferred embodiments of the invention, particularly in reference to the accompanying drawings. It should be appreciated, however, that these embodiments in no way serve to limit the invention.

What is claimed is:

1. A method of imaging a sample present in a solution, said method comprising:

providing a microscope having a cantilever that is under the solution, wherein the cantilever includes a base and a decay length;

contacting the cantilever with photothermal energy at a point on the cantilever which is present in solution to cause the cantilever to bend and vibrate, the center of the impinging photothermal energy being positioned at a distance from the cantilever base of from 1 to 2.5 times the decay length of the cantilever; and detecting the amplitude of vibration of the cantilever from the photothermal energy;

wherein the cantilever has at least one coating present thereon to absorb the photothermal energy such that the cantilever bends and vibrates at a resonance frequency.

2. The method according to claim 1, wherein the microscope is an Atomic Force Microscope.

3. The method according to claim 1, wherein the sample comprises a biological material.

4. The method according to claim 2, wherein the biological material is DNA.

5. The method according to claim 1, wherein the at least one coating comprises black coloring.

6. The method according to claim 1, wherein the cantilever comprises silicon or silicon nitride ($Si_3N_4$).

7. The method according to claim 1, wherein the at least one coating comprises at least one element selected from the group consisting of gold, palladium, silver, aluminum, and alloys thereof.

8. The method according to claim 1, wherein the cantilever has an additional coating present thereon, the additional coating being a reflective coating.

9. The method according to claim 8, wherein the reflective coating is positioned on the absorption coating.

10. The method according to claim 8, wherein the absorption coating is present on the reflective coating.

11. An atomic force microscope comprising a cantilever that is under solution and has a sample to be imaged, said cantilever including a base and a decay length wherein said cantilever has at least one coating positioned thereon to allow for absorption of photothermal energy which contacts said cantilever such that said cantilever bends and vibrates at a resonance frequency, the center of the impinging photothermal energy being positioned at a distance from the cantilever base of from 1 to 2.5 times the decay length of the cantilever.

12. A method of imaging a sample present in a solution by employing an atomic force microscope, said method comprising:

providing an atomic force microscope having a cantilever that is under the solution, wherein the cantilever includes a base and a decay length;

contacting the cantilever with photothermal energy at a point on the cantilever which is present in solution to cause the cantilever to bend and vibrate, the center of the impinging photothermal energy being positioned at a distance from the cantilever base of from 1 to 2.5 times the decay length of the cantilever; and detecting the amplitude of vibration of the cantilever from the photothermal energy;

wherein the cantilever has at least one coating present thereon to absorb the photothermal energy such that the cantilever bends and vibrates at a resonance frequency, the at least one coating having a coefficient of expansion which differs from a coefficient of expansion of the cantilever.

13. The method according to claim 12, wherein the sample comprises a biological material.

14. The method according to claim 13, wherein the biological material is DNA.

15. The method according to claim 12, wherein the at least one coating comprises black coloring.

16. The method according to claim 12, wherein the cantilever comprises silicon or silicon nitride ($Si_3N_4$).

17. The method according to claim 12, wherein the at least one coating comprises at least one element selected from the group consisting of gold, palladium, silver, aluminum, and alloys thereof.

18. The method according to claim 12, wherein the cantilever has an additional coating present thereon, the additional coating being a reflective coating.

19. The method according to claim 18, wherein the reflective coating is positioned on the absorption coating.

20. The method according to claim 18, wherein the absorption coating is present on the reflective coating.

* * * * *

UNITED STATES PATENT AND TRADEMARK OFFICE
CERTIFICATE OF CORRECTION

| | | |
|---|---|---|
| PATENT NO. | : 6,330,824 B1 | Page 1 of 1 |
| APPLICATION NO. | : 09/506617 | |
| DATED | : December 18, 2001 | |
| INVENTOR(S) | : Erie et al. | |

It is certified that error appears in the above-identified patent and that said Letters Patent is hereby corrected as shown below:

Column 1, Line 21; Please insert the following language before BACKGROUND OF THE INVENTION:

-- GOVERNMENT FUNDING

This invention was made with Government support under NIH Grant EB002025 awarded by the National Institutes of Health. The Government has certain rights in this invention. --

Signed and Sealed this
Eighteenth Day of December, 2012

David J. Kappos
*Director of the United States Patent and Trademark Office*